March 13, 1956 G. L. SHEPHERD 2,738,438
GRID STRUCTURE AND METHOD OF MAKING SAME
Filed Dec. 11, 1952 3 Sheets-Sheet 1
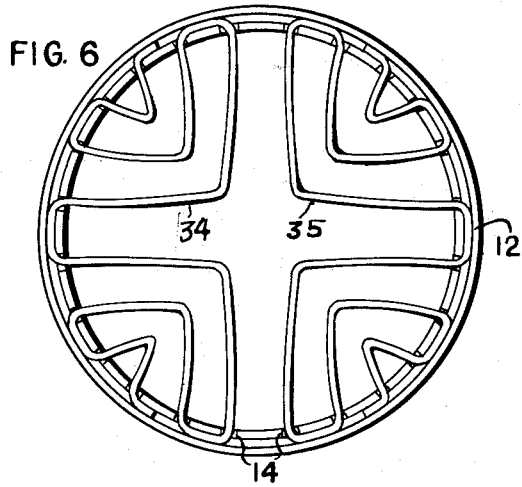
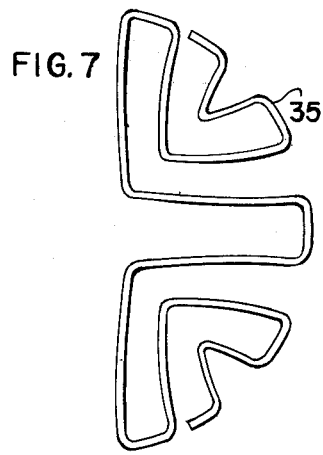
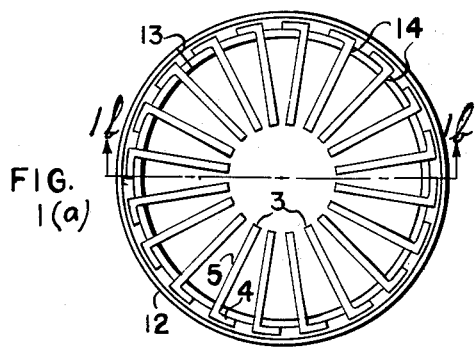
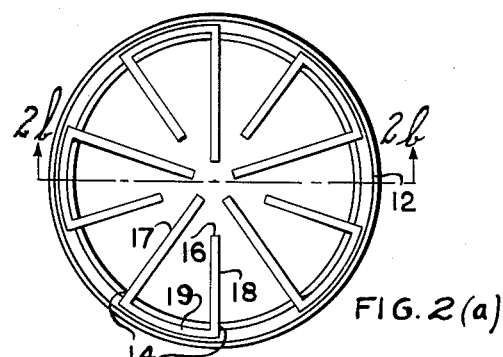
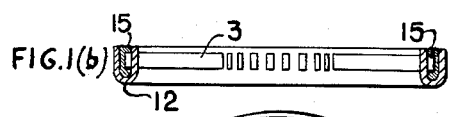
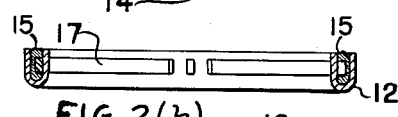
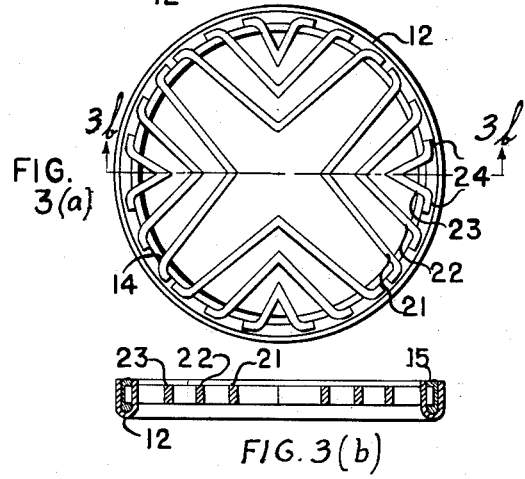
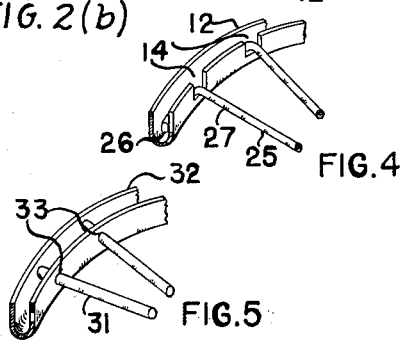
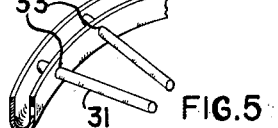
INVENTOR.
GORDON L. SHEPHERD
BY
Paul B. Hunter
Attorney.

March 13, 1956　　　G. L. SHEPHERD　　　2,738,438
GRID STRUCTURE AND METHOD OF MAKING SAME
Filed Dec. 11, 1952　　　3 Sheets-Sheet 2

INVENTOR.
GORDON L. SHEPHERD
BY
Paul B. Hunter
Attorney.

March 13, 1956     G. L. SHEPHERD     2,738,438
GRID STRUCTURE AND METHOD OF MAKING SAME
Filed Dec. 11, 1952                     3 Sheets-Sheet 3
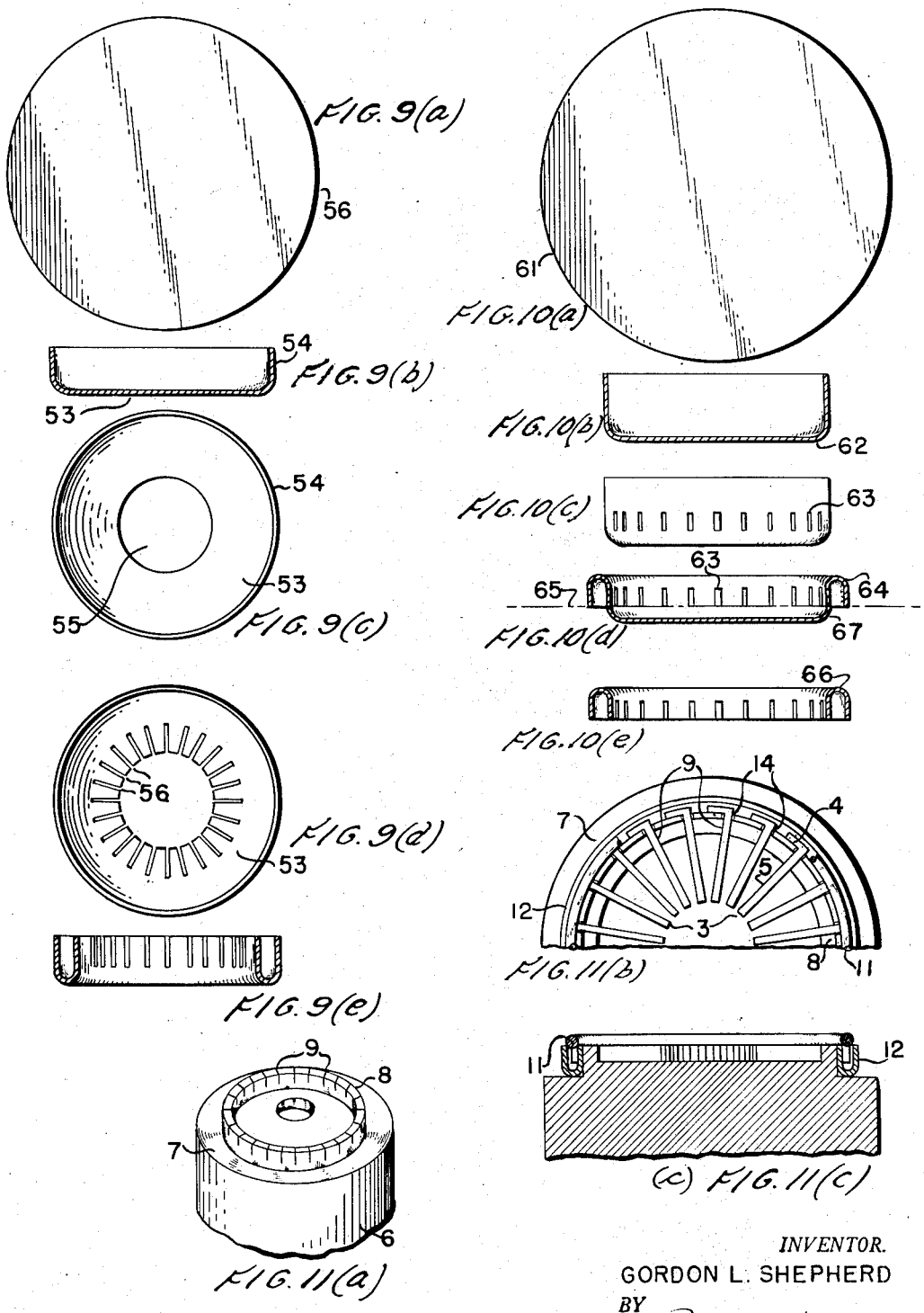
INVENTOR.
GORDON L. SHEPHERD
BY
Attorney

United States Patent Office 2,738,438
Patented Mar. 13, 1956

2,738,438

GRID STRUCTURE AND METHOD OF MAKING SAME

Gordon L. Shepherd, San Mateo, Calif., assignor to Varian Associates, San Carlos, Calif., a corporation of California Application December 11, 1952, Serial No. 325,286

4 Claims. (Cl. 313—348)

This invention relates to improved electrode structures for electron discharge devices, and more particularly relates to novel grid structures and the method of making same.

One object of this invention is to provide a novel grid structure and method for making the same which eliminates the use of expensive jigs having close tolerances, while at the same time providing a structurally improved grid.

Another object of this invention is to provide a novel grid structure and method of making the same wherein the grid elements are easily held in contact with the mounting ring member prior to and during the brazing or spotwelding step.

Another object of this invention is to provide a novel grid structure and method of making the same in which the grid structure comprises a channel-shaped outer ring member and grid elements adapted so as to have portions thereof mounted within the channel of the ring and other portions thereof extending through openings in the inside wall of the ring member and toward the axial center of the ring.

Other objects and advantages will become apparent from the following specification taken in connection with the accompanying drawings wherein Figs. 1(a) and 1(b) show a grid structure utilizing L-shaped grid elements which embodies the present invention. Fig. 1(a) is a plan view of the novel grid while Fig. 1(b) is a section view taken along line 1b—1b in Fig. 1(a) in the direction of the arrows.

Figs. 2(a) and 2(b) show a second grid structure embodying this invention which utilizes J-shaped grid elements. Fig. 2(a) is a plan view of the structure while Fig. 2(b) is a section view of the structure taken along line 2b—2b in Fig. 2(a) in the direction of the arrows.

Figs. 3(a) and 3(b) show another type grid structure which embodies this invention, the grid elements being V-shaped and nested within each other in the grid member. Fig. 3(a) is a plan view of the grid structure while Fig. 3(b) is a section in view taken along line 3b—3b in Fig. 3(a) looking in the direction of the arrows.

Fig. 4 shows a section of a type of grid structure similar to that of Fig. 3 but which employs filament or rod-shaped grid elements in lieu of ribbon type grid elements.

Fig. 5 illustrates a section of still another modified grid structure embodying this invention.

Fig. 6 shows in plan view still another embodiment of this invention wherein the grid elements are made from two continuous lengths of ribbon material.

Fig. 7 shows one of the continuous grid elements disclosed in Fig. 6.

Figure 8A:
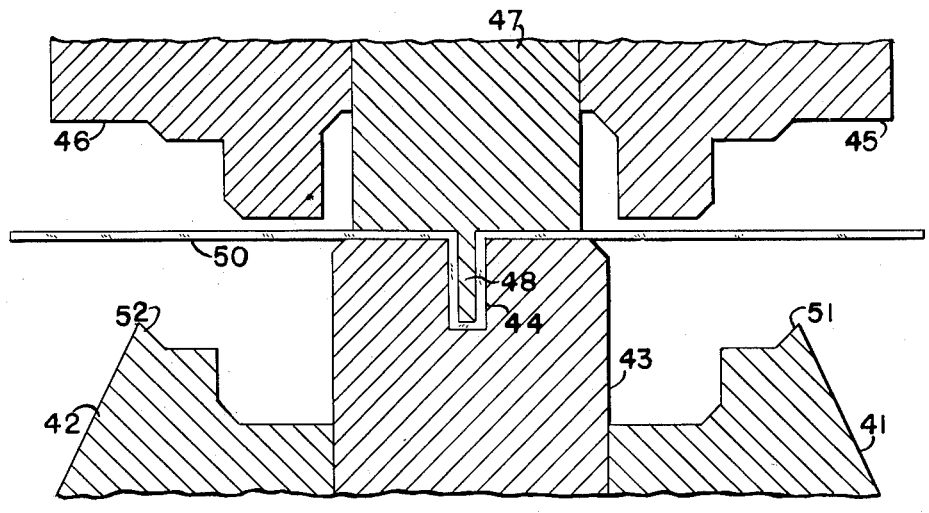
Figure 8B:
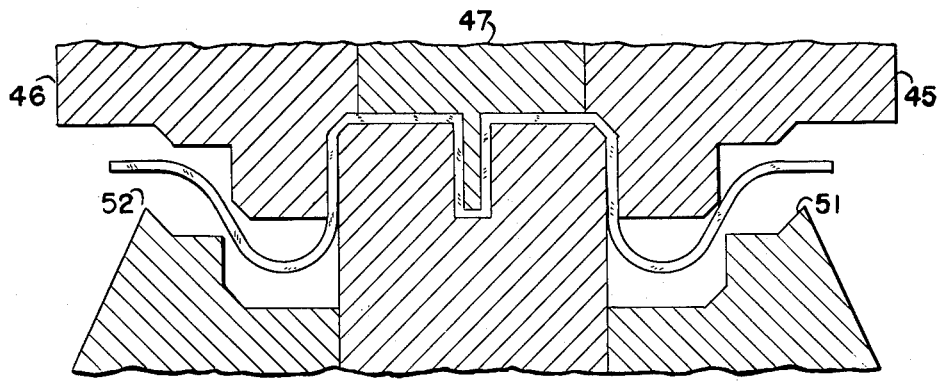
Figure 8C:
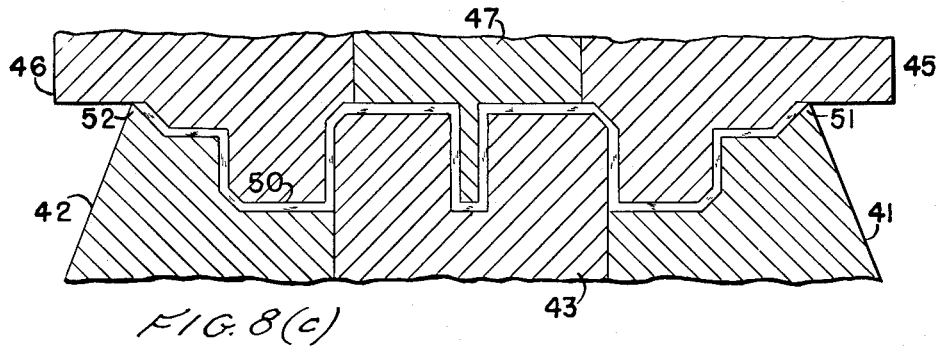

Figs. 8(a), 8(b) and 8(c) illustrate one method of forming the grid element shown in Fig. 7.

Figs. 9(a), 9(b), 9(c), 9(d) and 9(e) illustrate one method of forming a preferred structure of ring member used herein.

Figs. 10(a), 10(b), 10(c), 10(d) and 10(e) illustrate a second method of forming the preferred ring member utilized in the grid structure of certain embodiments of the present invention.

Figs. 11(a), 11(b) and 11(c) illustrate one method of assembling the novel grid structures embodying this invention.

In the following description, similar elements will bear the same reference numbers in the different figures.

Referring now to the drawings there are disclosed embodiments of this invention which eliminate the need for expensive jigs with close tolerances heretofore necessary in this art while at the same time provide a better constructed grid structure. In the embodiment disclosed in Figs. 1(a) and 1(b), the grid structure comprises an open frame mounting member or ring 12 which is a metallic ribbon such as steel or nickel bent so as to have a U-shaped cross-section with an inner wall, outer wall and lower connecting wall and formed in a circular ring securely joined as by welding at joint 13. The ring member may be formed without a joint as will hereinafter be described. A plurality of equally spaced openings or slits 14 are cut in the inner surface or wall of the U-shaped ring 12 each having an open side. The L-shaped grid elements 3 of the grid network, which may be made of tungsten ribbon for example, are located in the U-shaped ring member 12 with their short leg portions 4 in the channel or passage of the ring member 12 and with their long leg portions 5 extending through the openings 14 radially into the ring, the thin edges of the ribbon grid elements facing the plane of the grid structure. The grid elements 3 are securely mounted in the ring 12 by brazing, the binder or brazing material 15 being flowed into the channel of the ring member 12 and around the short legs 4 of the grid elements 3 and then hardening, thereby securely retaining the grid elements in place. The brazing material is not shown in Fig. 1(a) so that the grid elements may be more clearly defined but this material is shown in Fig. 1(b). During the brazing step, the molten brazing material is confined within the ring member 12 by gravity but may flow unobstructed therein. Some brazing material seeps into the openings 14 in the ring 12 and this tends to further strengthen the mounting. One method of assembling the novel grids or grid structures embodying this invention, such as shown in Figs. 1 through 6, inclusive, is subsequently described. It should be noted that in this and all other embodiments the channel in the ring member 12 may take any convenient shape other than U-shape.

A second embodiment of this invention is disclosed in Figs. 2(a) and 2(b). In this particular embodiment, the grid elements 16 are J-shaped, each having a long leg 17, a short leg 18 and a cross piece 19 joining one end of each leg. The J-shaped grid elements 16 are fixedly secured in the U-shaped ring member 12 as by brazing with a long leg 17 and a short leg 18 of each element extending into the grid opening through adjacent slits 14 in the ring member, the cross piece 19 lying in the channel of the ring member 12. The hardened brazing material 15 is shown in Fig. 2(b) while omitted from Fig. 2(a).

In Figs. 3(a) and (b) is shown another type grid structure which embodies this invention. The grid elements comprise a plurality of sets of V-shaped grid ribbons, each set comprising three V-shaped members 21, 22 and 23 nested one within another. Each V-shaped element has lips 24 on each end thereof, these lips 24 being secured within the channel of the grid ring member 12 as by brazing, the V-shaped portion of the element extending through openings 14 in the inside wall of the grid ring with its apex projecting toward the axial center of the ring 12.

Still another type of grid structure embodying this invention is shown in Fig. 4. Here the grid elements are made up of metallic filaments or rods 25 rather than the ribbon material used in the above described grid structures. In this particular embodiment, the rods are L-shaped, the short leg 26 lying in the channel of the ring member 12 and the long leg 27 extending through the openings 14 in the inside wall of the ring member 12 in toward the axial center of the grid structure, similar to the structure of Fig. 1. The brazing material in the channel is not shown in this figure.

In Fig. 5 is shown still another embodiment of this invention. The grid elements are made up of straight metallic filaments or rods 31. The channel-shaped grid ring 32 has round holes 33 in the inside wall thereof rather than slits with one open side. The rod-shaped grid elements 31 extend through holes 33 and are secured in the ring 32 such as by brazing the outer portions thereof within the channel of the ring member 32 while the main portions thereof extend from the hole 33 radially toward the center of the grid structure. The brazing material in the channel is not shown in this figure.

Still another embodiment of this invention is disclosed in Fig. 6. In this embodiment, the grid network comprises grid elements 34 and 35 which are formed from two lengths of metallic ribbon, each length being shaped and formed so as to provide the grid elements for one-half of the grid structure. Making the grid elements in two sections as in Fig. 6 eliminates the need for lapping the ribbon on the outside periphery of the grid element. The grid element for the complete grid structure could be made from one continuous length of ribbon. In Fig. 7 is shown one of the lengths of metallic ribbon which is shaped to form the grid element 35 for one-half of the grid structure shown in Fig. 6. This length may be formed to the proper shape by hand or may be pre-formed automatically in a jig such as that shown in Figs. 8(a), 8(b) and 8(c) and then formed into its final shape by hand before or during assembly into the U-shaped ring member.

Referring to Figs. 8(a), 8(b) and 8(c), a preferred forming jig is shown therein made up of a lower section comprising a fixed base having side portions 41 and 42 and a vertically movable center portion 43 adapted to be moved downwardly into the base upon pressure from a top portion of the jig when triggered and adapted to move vertically upward to its normal position when the pressure is removed. This center portion has a rectangular shaped groove 44 in the center thereof. The upper section of the jig comprises two end portions 45 and 46 and a center portion 47, the center portion 47 being adapted so as to be vertically movable with respect to the two side portions 45 and 46, the side portions and the center portion being adapted to be movable as a unit with respect to the base portions of the jig assembly. This center portion 47 of the upper section has a rectangular shaped finger 48 in the center thereof adapted to fit within the groove 44 in the lower center portion, allowing space for the grid ribbon.

In operation, a ribbon of grid element material 50 is laid flat on the upper surface of the center portion of the jig assembly. The upper section of the jig is lowered initially as a unit until such time as the center portion 47 thereof has been lowered so as to form the U-shaped indenture in the ribbon as shown in Fig. 8(a). The two end portions 45 and 46 of the upper section of the jig continue to move downwardly, the upper center portion 47 and lower section of the jig remaining stationary, until the ribbon 50 has been further formed as shown in Fig. 8(b). At this time the center portion 43 of the lower section is triggered and this center portion then moves downwardly along with the upper section of the jig until the ribbon has been formed as shown in Fig. 8(c), at which time the ribbon is severed at points 51 and 52. This pre-formed grid element is subsequently further formed by hand by bending into the shape shown in Fig. 7.

One method of making one type of ring member utilized in this invention is shown in Figs. 9(a), 9(b), 9(c), 9(d) and 9(e). A disk-shaped member 56 is stamped from a sheet of material such as steel. The outer periphery of the disk 56 is turned up to form a cup having a bottom portion 53 and a side portion 54. A hole 55 is cut in the bottom portion of the cup and then a plurality of mutually spaced radial slits 56 are cut in the bottom portion 53. The bottom portion is then bent upwardly to thus form the U-shaped ring (similar to ring 12 of the above figures) having mutually spaced slits 56 in the inner wall thereof. The slits 56, rather than having one open side, could have completely enclosed openings of any shape such as, for example, round openings as disclosed in Fig. 5.

An alternative method of making the ring member is shown in Figs. 10(a), 10(b), 10(c), 10(d) and 10(e). The disk 61 is formed into a cup 62 and mutually spaced openings 63 are then cut in the side wall of the cup 62. The upper edge of the cup is then folded outwardly down, thus forming a U-shaped lip 64 on the cup, the cup then having the openings 63 on the inside wall thereof. The bottom section 67 of the cup may then be cut away along line 65, thus leaving the U-shaped ring 66 having openings in the inner wall thereof similar to the ring member shown in Fig. 9(e).

In Figs. 11(a), 11(b) and 11(c) is shown in plan and section view one method of assembling the novel grid structures embodying this invention. A jig such as shown in Fig. 11(a) is used, but this jig does not have the close tolerances heretofore required. This assembly jig 6 comprises a solid cylindrical metallic body 7 and a raised hollow cylindrical portion 8 on the upper surface of said body 7 and integral thereto, said portion having a smaller diameter than said body. A plurality of equally spaced slits 9 are located around the upper peripheral edge of the raised portion 8. The channel-shaped ring member 12 is placed, with open end up, around the upper cylindrical portion 8 of the jig, coming to rest on the upper surface of the body 7. The grid elements 3, in this example L-shaped ribbons as disclosed in Figs. 1(a) and (b), are placed with their short legs 4 in the channel and their long legs 5 extending through the slits 14 in the ring and the slits 9 in the jig. A ring of brazing material 11 of proper diameter is placed on top of the ring member 12 in the channel opening. The assembly is then placed in an oven, the brazing material melting and flowing, due to gravity, down into the channel and around all of the short legs of the grid elements therein, thereby firmly securing the grid elements in fixed spaced relation. The ring member 12 may be plated on its inside surface with brazing material before assembly rather than using a ring of the material. The ring 11 of brazing material can be used in conjunction with the ring 12 plated with brazing material. It is obvious that the grid structure may be easily assembled without the use of an assembly jig.

In all of the above embodiments the method employed for mounting the grid elements within the channel-shaped mounting ring utilized brazing techniques. It should be understood that mounting methods other than the brazing technique could be employed in lieu thereof such as, for instance, welding or soldering. Also, after the elements have been placed in the channel-shaped ring in certain embodiments, the side walls thereof may be pinched or squeezed together to sandwich the grid elements therein before, during or in lieu of the brazing or welding step.

The above embodiments of this invention illustrate wherein this invention possesses distinct advantages over the prior art. One advantage is that in the present invention the spacing of the grid elements circumferentially around the inside wall of the ring member is accurately fixed by the openings in the wall, whereas heretofore, in the absence of an expensive assembly jig for accurately spacing the grid elements, such spacing, particularly in hand assembly, was roughly estimated resulting in improper grid element spacing and loss in tube efficiency. Another advantage is that the grid elements are rigidly embedded in the mounting ring member rather than having merely surface contact therewith as in prior grid structures. The resulting increase in contact area also provides better heat conductivity from the grid elements to the mounting ring and thus to the cooler parts of the electron discharge device and at the same time greatly decreases the possibility that the grid elements will ever become loosened from the mounting ring due to melting of the brazed joint, one of the chief reasons for microphonics in high frequency electron discharge devices as heretofore manufactured.

Since many changes could be made in the above construction of the grid structure and many apparently widely different embodiments of this invention could be made without departing from the scope thereof, as, for example, the use of open frame mounting members of shapes other than annular as shown herein, yet adapted to permit the easy flow of brazing or other mounting material therein, it is intended that all matter contained in the above description or shown in the accompanying drawings shall be interpreted as illustrative and not in a limiting sense.

What is claimed is:

1. A grid structure comprising a open frame mounting member having inner and outer walls and a connecting wall forming a passage therein, said member having a plurality of openings in the inner wall thereof, a grid network comprising a plurality of ribbon-shaped grid elements having portions thereof extending through said openings into such passage and other portions of the ribbon-shaped grid elements extending into the frame opening, and a hardened mass of metallic binder material within the passage providing a solid, rigid fusion of the inner, outer and connecting walls and the grid portions within the passage whereby the ribbon-shaped radially positioned grid elements are secured in a rigid, non-microphonic grid structure.

2. A grid structure comprising an open frame mounting member formed with a channel therein, said frame member having a plurality of openings in the wall thereof, a plurality of J-shaped ribbon grid elements, each comprising a short leg and a long leg joined at one end by a cross piece, each of said grid elements having its cross piece located in the channel and its short and long legs extending through adjacent openings in said wall into the frame opening, and a hardened mass of metallic binder material within the channel producing a solid, rigid fusion of the mounting member and the grid elements in the channel whereby the ribbon-shaped radially positioned grid elements are secured in a rigid non-microphonic grid structure.

3. The method of making a unitary grid structure which comprises forming a channel-shaped ring with the opening of the channel parallel to the axis of the ring, forming a plurality of openings in the inner wall of said ring, positioning a plurality of grid segments in the ring member with a portion of each thereof in the channel of the ring and another portion of each extending through a corresponding opening in toward the axial center of the ring, setting a ring of brazing material on the top of the channel in said first ring, heating said first ring, grid segments, and brazing ring to thereby cause said brazing material to flow in the channel and around the portion of grid segments therein, and allowing the grid structure to cool to harden the brazing material and thereby fuse the grid structure into a rigid unit.

4. The method of making a unitary grid structure which comprises forming a disk-shaped sheet of metal, turning up the edges of the disk to form a cup having a side portion and a bottom portion, removing the center of the bottom portion of the cup-shaped disk to thereby form a ring, placing a plurality of spaced openings in the bottom portion of the ring, bending the inner periphery of the bottom portion of the ring upwardly to thereby form a channel-shaped ring having openings in the inner wall thereof, placing a plurality of grid segments in the ring member with a portion thereof in the channel of the ring and another portion thereof extending through the opening in toward the axial center of the ring, and causing a brazing material to flow in the channel and around the portion of the grid segments therein.

References Cited in the file of this patent

UNITED STATES PATENTS

| | | |
|---|---|---|
| 169,192 | Richardson | Oct. 26, 1875 |
| 454,618 | Gaiger | June 23, 1891 |
| 1,947,412 | Hallopeau et al. | Feb. 13, 1934 |
| 2,036,069 | Morrison | Mar. 31, 1936 |
| 2,515,267 | Salisbury | July 18, 1950 |

FOREIGN PATENTS

| | | |
|---|---|---|
| 439,153 | Great Britain | Nov. 29, 1935 |